(12) United States Patent
Sato et al.

(10) Patent No.: US 8,726,971 B2
(45) Date of Patent: May 20, 2014

(54) SHUTTER

(75) Inventors: Fumitoshi Sato, Anjo (JP); Yoshitaka Uramoto, Anjo (JP); Hirokazu Amano, Anjo (JP)

(73) Assignee: INOAC Corporation, Aichi (JP)

( * ) Notice: Subject to any disclaimer, the term of this patent is extended or adjusted under 35 U.S.C. 154(b) by 0 days.

(21) Appl. No.: 13/444,332

(22) Filed: Apr. 11, 2012

(65) Prior Publication Data

US 2013/0269886 A1 Oct. 17, 2013

(51) Int. Cl.
*B60R 7/04* (2006.01)

(52) U.S. Cl.
USPC .................................. 160/231.2; 296/24.34

(58) Field of Classification Search
USPC ............... 160/230, 231.1, 231.2; 296/24.34; 312/297
See application file for complete search history.

(56) References Cited

U.S. PATENT DOCUMENTS

| | | | |
|---|---|---|---|
| 3,645,597 A * | 2/1972 | Sakow | 312/297 |
| 6,478,204 B2 * | 11/2002 | Lange et al. | 224/539 |
| 6,499,785 B2 * | 12/2002 | Eguchi | 296/37.8 |
| 6,672,554 B2 * | 1/2004 | Fukuo | 248/311.2 |
| 7,475,954 B1 * | 1/2009 | Latunski | 312/297 |
| 7,540,391 B2 * | 6/2009 | Kato | 220/252 |
| 7,735,538 B2 * | 6/2010 | Ogawa | 160/230 |
| 7,823,949 B2 * | 11/2010 | VandenHeuvel et al. | 296/37.8 |

FOREIGN PATENT DOCUMENTS

| | | |
|---|---|---|
| JP | H08-28131 A | 1/1996 |
| JP | 2008-24099 A | 2/2008 |

* cited by examiner

*Primary Examiner* — David Purol
(74) *Attorney, Agent, or Firm* — DLA Piper LLP (US)

(57) ABSTRACT

A shutter (S) including a plurality of support portions (10) provided in array in a sliding direction of the shutter, a hinge portion (20) for connecting adjoining two support portions (10), and slide supporting portions (30) provided at both ends of each support portion (10) so as to face a pair of guiderails. Each slide supporting portion (30) has a pair of first and second abutting portions (32 and 34) formed in array in the sliding direction for slidably engaging with the guiderail. Each support portion (10) is supported by the pair of guiderails at three or more out of a total of four first and second abutting portions (32 and 34) when a load is applied to the shutter from the outside.

7 Claims, 11 Drawing Sheets

SHUTTER

BACKGROUND OF THE INVENTION

1. Filed of the Invention

The present invention relates to a shutter disposed slidably along a pair of guiderails arranged in an opposed manner in, for instance, an automobile.

2. Related Art

As shown in FIG. 8, in a floor console FC installed in, for example, a compartment of an automobile, an article housing portion 102 that opens upward is defined inside a console main body 100. As a cover member for opening and closing the upper opening 104 of the article housing portion 102, a shutter S1 is employed. In this structure, the slide supporting portions 74 provided at both side edges of the shutter S1 are respectively engaged with a pair of guiderails L1, L2 that are disposed oppositely at the right and left sides of the article housing portion 102, so that the shutter S1 slides in the front-back direction along the guiderails L1 and L2.

The shutter S1 is extended substantially horizontally and flat on the upper surface of the console main body 100 when the article housing portion 102 is closed. When the article housing portion 102 is opened, the shutter S1 is housed in a curved manner in the inside rear portion of the console main body 100. Thus, the shutter S1 is required to be deformed into a flat state and a curved state. In addition, the shutter S1, when the article housing portion 102 is in a closed state, may have an aspect in which, for example, an article or an arm (elbow) is placed on the upper surface thereof, and hands are put on the shutter S1 when passengers get in and out of the compartment. Thus, the shutter S1 is required have flexibility which allows it to be deformed into a curved state and rigidity which supports a certain degree of load thereon. Accordingly, a conventional shutter S1 is comprised of, as shown in FIGS. 9(a) to 10(b), a plate member 60 molded with a soft resin (thermoplastic elastomer, etc.) and a rib member 70 molded with a resin (polyethylene, polypropylene, acrylonitrile butadiene styrene (ABS), polycarbonate, etc.) harder than the soft resin. In other words, the conventional shutters S1 are produced by means of what is called multicolor molding method, and those which are molded from two or more types of resins having different hardness are employed.

In the above-described plate member 60, cell portions 62 and hinge portions 64 thinner than the cell portions 62 are formed alternately in the sliding direction, so that elastic curvature deformation can be made at each hinge portion 64. Further, each rib member 70 comprises a rib portion 72 extended along the cell portion 62 and slide supporting portions 74 provided respectively at one end and the other end of the rib portions 72. The respective rib members 70 are separated from each other individually in the sliding direction, in which the rib portion 72 is mated with the cell portion 62 of the plate member 60, and each slide supporting portion 74 is elongated sideward beyond the plate member 60. Accordingly, the shutter S1 is able to slide along the guiderails L1 and L2 when the respective slide supporting portions 74 of each rib member 70 engages with the groove portions 114 of the corresponding guiderails L1 and L2. The shutter S1 designed in such a manner as describe above is disclosed in, for example, Japanese Patent Application Laid-Open (Kokai) No. 2008-24099

Each rib member 70 in the above-described structure is in such a form that its two slide supporting portions 74 are engaged with the groove portions 114 of the guiderails L1 and L2. Accordingly, when a load is applied thereto from the front side of the shutter S1, it is supported by the guiderails L1 and L2 in a two-point support fashion in which the line B1 that connects the abutting points P1 and P2 of both slide supporting portions 74 becomes one straight line as shown in FIG. 11(a). Moreover, the abutting portions 74A of the slide supporting portions 74 are in a form of spherical body so as to decrease the frictional resistance with respect to the groove portions 114 of the guiderails L1 and L2. Accordingly, when a load is applied to the rib portion 72 of the slide supporting portion 74 at a position shifted from the line B1 in the sliding direction, the rib member 70 ends in rotational displacement around an axis extended in the width direction of the shutter. Accordingly, as shown in FIG. 11(b), when a load is applied to the hinge portion 64 of the plate member 60, the rib members 70 adjoining the hinge portion 64 come to be rotationally displaced reversely around an axis extended in the width direction. As a result, there is a fear that the plate member 60 is broken at the hinge portion 64 due to the concentration of stress on the hinge portion 64. Furthermore, when a load is applied from the front side of the shutter S1 in a state that the rib portion 72 declines, the rib member 70 fails to show pre-designed rigidity, and there is a possible fear that the rib member 70 is broken.

SUMMARY OF THE INVENTION

Therefore, an object of the present invention is to inexpensively provide a shutter which is free of deformation or breakage that would be caused by a load applied thereto.

In order to solve the above-mentioned problems and to achieve the intended object, the invention of the present application provides a shutter that is disposed slidably between a pair of guiderails arranged in an opposed manner, and it comprises:

a support portion provided in array in a sliding direction of the shutter for supporting a load applied thereto;

a hinge portion having flexibility and provided so as to connect the adjoining support portions; and a pair of abutting portions formed in array in the sliding direction at each end of each one of the support portions so as to be slidably engaged with the guiderails, wherein the support portion and the abutting portion are integrally molded from same material, and each of the support portions is supported by the pair of guiderails at three or more out of the total of four abutting portions with two being provided at each end thereof when a load is applied to the shutter from the front side.

According to the above structure of the present invention, each support portion is supported by a pair of guiderails at three or more out of the four abutting portions in total with two being formed in array in the sliding direction when a load is applied to the shutter. Therefore, the support portion is prevented from being rotationally displaced around an axis, which extends in the width direction orthogonal to the sliding direction of the shutter, when tress is applied to the front side of the shutter.

In the present invention, the hinge portion can be formed from a material softer than that of the support portion and abutting portion.

According to this structure, in the shutter, when a load is applied on each support portion from the front side (or outside) of the shutter, stress is less likely to concentrate on the hinge portion connecting the support portions; as a result, it becomes possible to form a hinge portion that has flexibility from a material softer than that of each support portion which is capable of supporting the load.

In addition, in the present invention, the support portion, the hinge portion and the abutting portion can be integrally molded from the same material.

According to this structure, in the shutter, when a load is applied on each support portion from the front side, stress is less likely to concentrate on the hinge portion connecting the support portions; as a result, the hinge portion, which has flexibility by being formed to be thinner than the support portion from the same material as that of each supporting portion which is capable of supporting the load, can be formed integrally with the support portion. In this manner, since only one type of molding material is used to integrally mold a shutter in one step, material costs can be inexpensive and man-hours for molding operation can be reduced as well to keep production costs down, so that it becomes possible to produce the shutter inexpensively. In addition, since the shutter is molded integrally from one type of molding material, the shutter is prevented from being partly detached.

Furthermore, in the present invention, each of the support portions can be provided with a pair of abutting portions at each end thereof with the center in the sliding direction of the support portion in between.

Therefore, according to this structure, even if a load is applied to a position shifted from the center (a position closer to the hinge portion than the center) in the sliding direction of the support portion, the support portion is less likely to be rotationally displaced around the axis extended in the width direction that is orthogonal to the sliding direction of the shutter.

Furthermore, in the present invention, the support portion can be provided in a protruding manner toward the backside so as to protrude from the side of the hinge portion and the pair of abutting portions are provided further backside than the hinge portion, the hinge portion allows the shutter to be in a flat state in which the adjoining support portions are away from each other in the sliding direction and in a curved state in which the support portions are in proximity to each other, and the adjoining abutting portions with the hinge portion being sandwiched thereby are, in the flat state of the shutter, formed such that the faces of the abutting portions opposed to each other in the sliding direction becomes further separated from each other in a direction away from the hinge portion.

Therefore, according to this structure, the shutter is deformed into the curved state in which the adjoining support potions are in proximity in the sliding direction of the shutter because of the deformation of the hinge portion. Further, the adjoining abutting portions with the hinge portion being sandwiched in between are, in the flat state of the shutter, formed such that the faces opposed to each other in the sliding direction becomes further separated from each other in the direction away from the hinge portion Accordingly, even if a clearance in the sliding direction between the pair of abutting portions provided at both ends of the support potion is set greater, the abutting portions are not brought into contact with each other when the shutter is deformed into the curved state, and the shutter is not prevented from being deformed into the curved state: In addition, since the clearance in the sliding direction between the pair of abutting portions provided at the support potion can be greater, the stability of the support portion when a load is applied to the shutter in the flat state can be enhanced.

Furthermore, in the present invention, the size of each of the support portions in a thickness direction that is orthogonal to the sliding direction can be minimum at both ends in an opposing direction of the pair of guiderails and can be larger at a central portion in the opposing direction than at both ends.

Therefore, according to this structure, even if a load is applied to the support portion, the support portion is less likely to be deflectively deformed in the width direction orthogonal to the sliding direction of the shutter, and stress is prevented from concentrating on the hinge portion.

Still further, in the present invention, each of the abutting portions can be configured to be point-contacted with the guiderail due to a curve-shaped formation of the face abutting the guiderail.

Therefore, according to this structure, each of the abutting portions is point-contacted with the guiderail, and thus the pair of abutting portions provided in array in the sliding direction always abuts at a position away from each other in the sliding direction; therefore, the support portion is stably supported by the guiderail. In addition, since the frictional resistance between each of the abutting portions and the guiderail becomes smaller, the shutter can be moved with less power, and the operability of opening and closing of the shutter is high.

As seen from the above, according to the shutter of the present invention, it is possible to provide inexpensive production thereof as well as prevention of deformation or breakage thereof that would be caused by a load that is applied thereto.

DETAILED DESCRIPTION OF THE INVENTION

Figure 1:
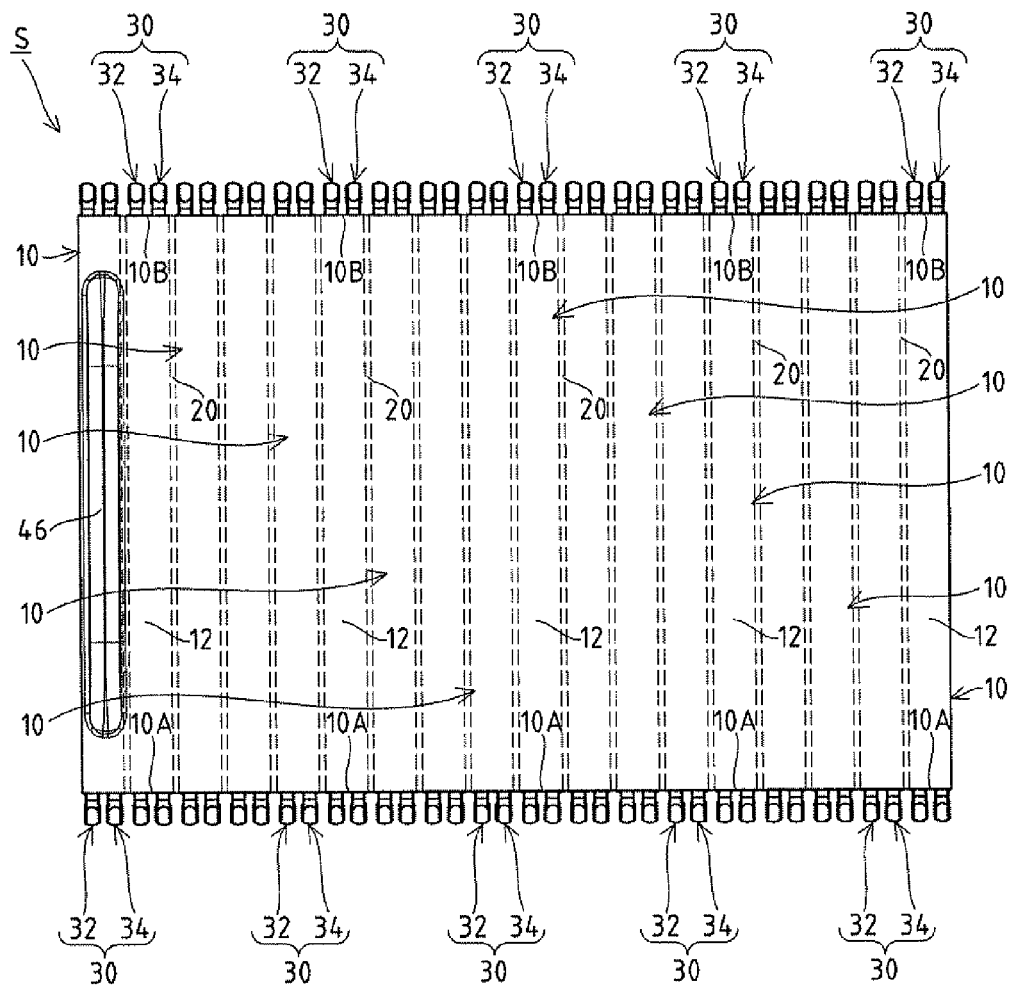
FIG. 1(a) is a plan view of a shutter according to Embodiment 1 of the present invention.
FIG. 1(b) is a side view of the shutter.
Figure 1:
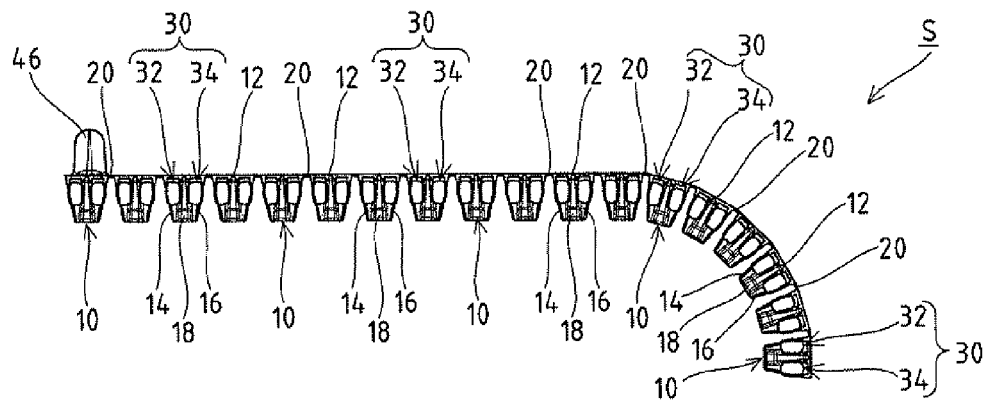
Figure 2:
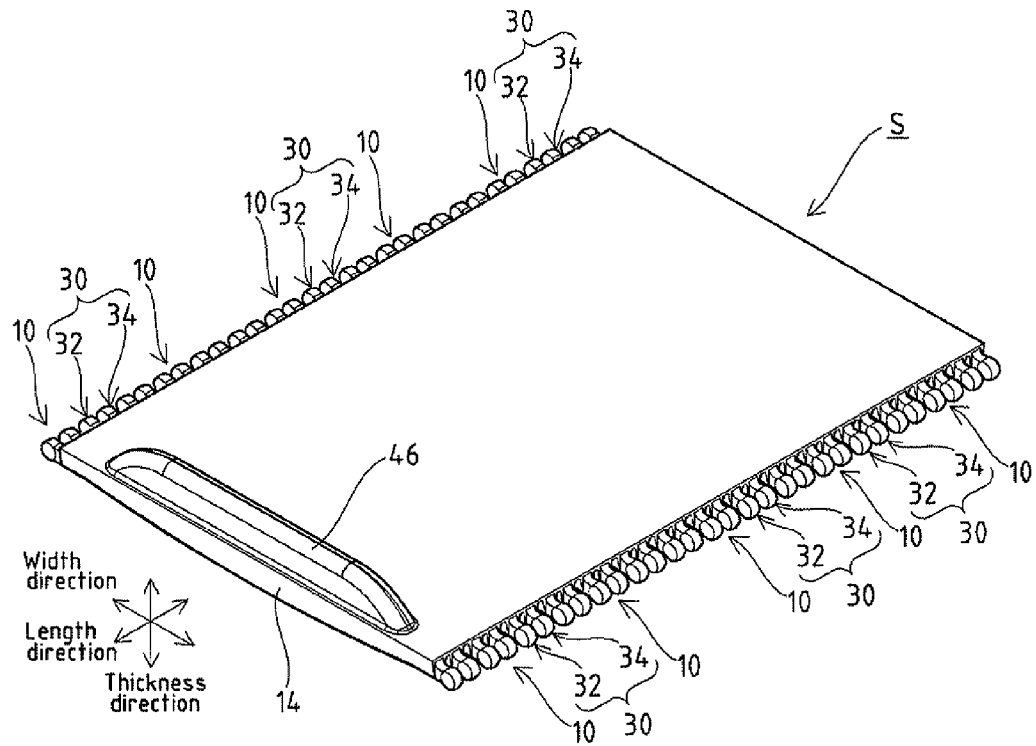
FIG. 2(a) is a perspective view of a shutter according to Embodiment 1.
FIG. 2(b) is a perspective view showing one of support portions constituting the shutter.
Figure 2:
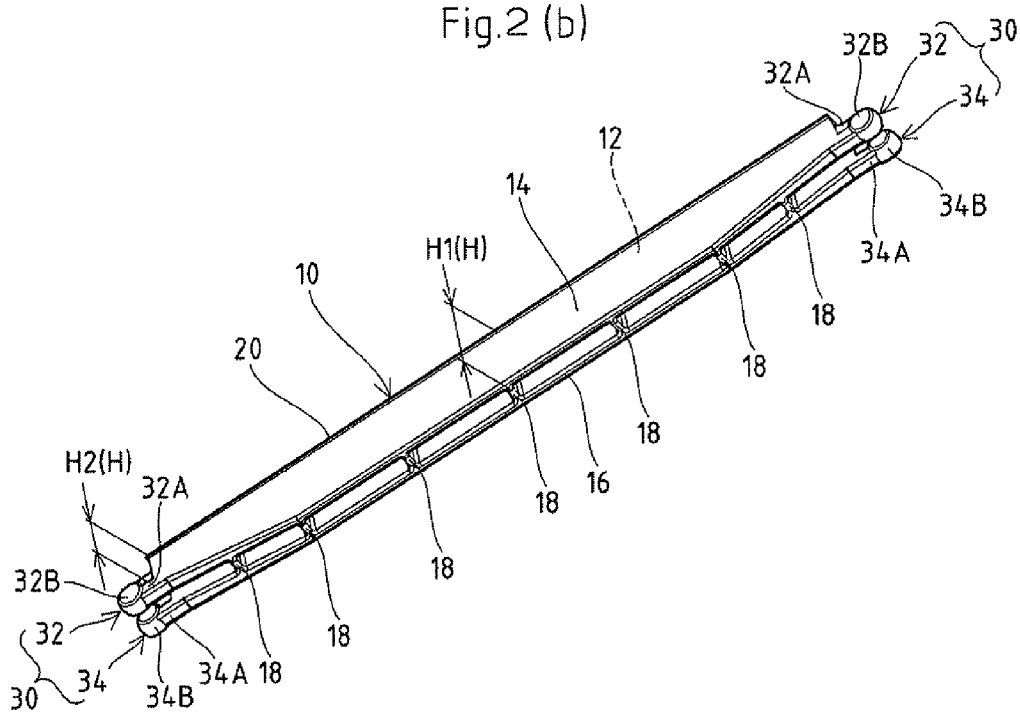
Figure 3:
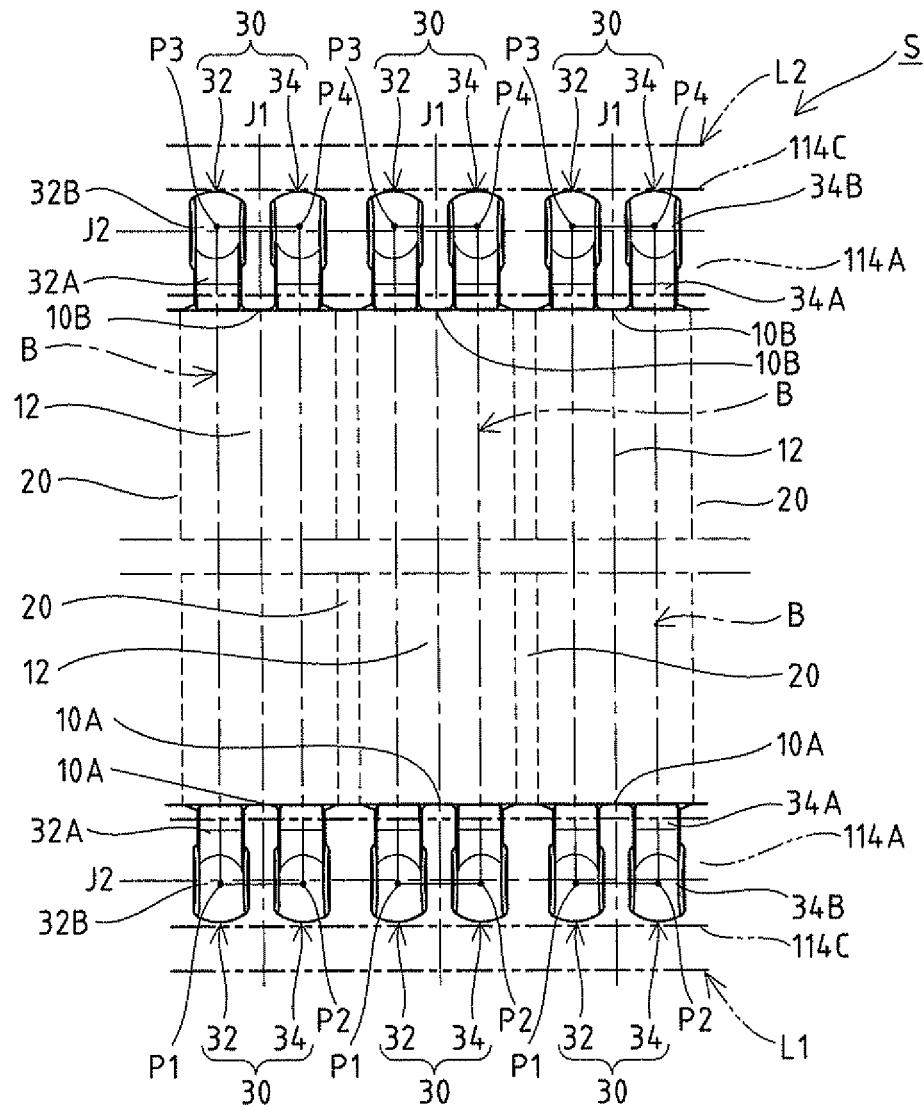
FIG. 3(a) is an explanatory drawing illustrating that the support portion is supported by a pair of guiderails by means of four-point support that is formed by a pair of abutting portions of a slide supporting portion provided at one end of the support portion and another pair of abutting portions of a slide supporting portion provided at the other end of the support portion.
FIG. 3(b) is an explanatory drawing illustrating the state in FIG. 3(a) seen from the side.
Figure 3:
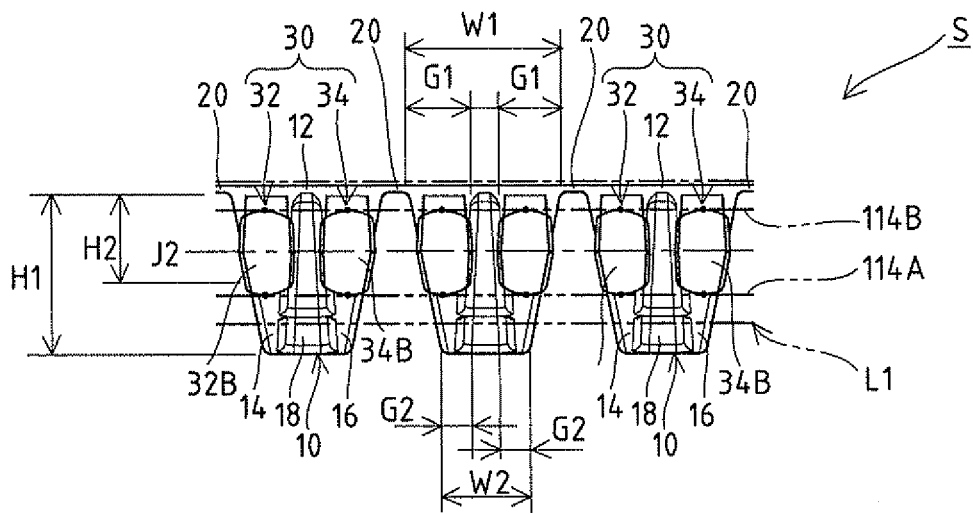
Figure 4:
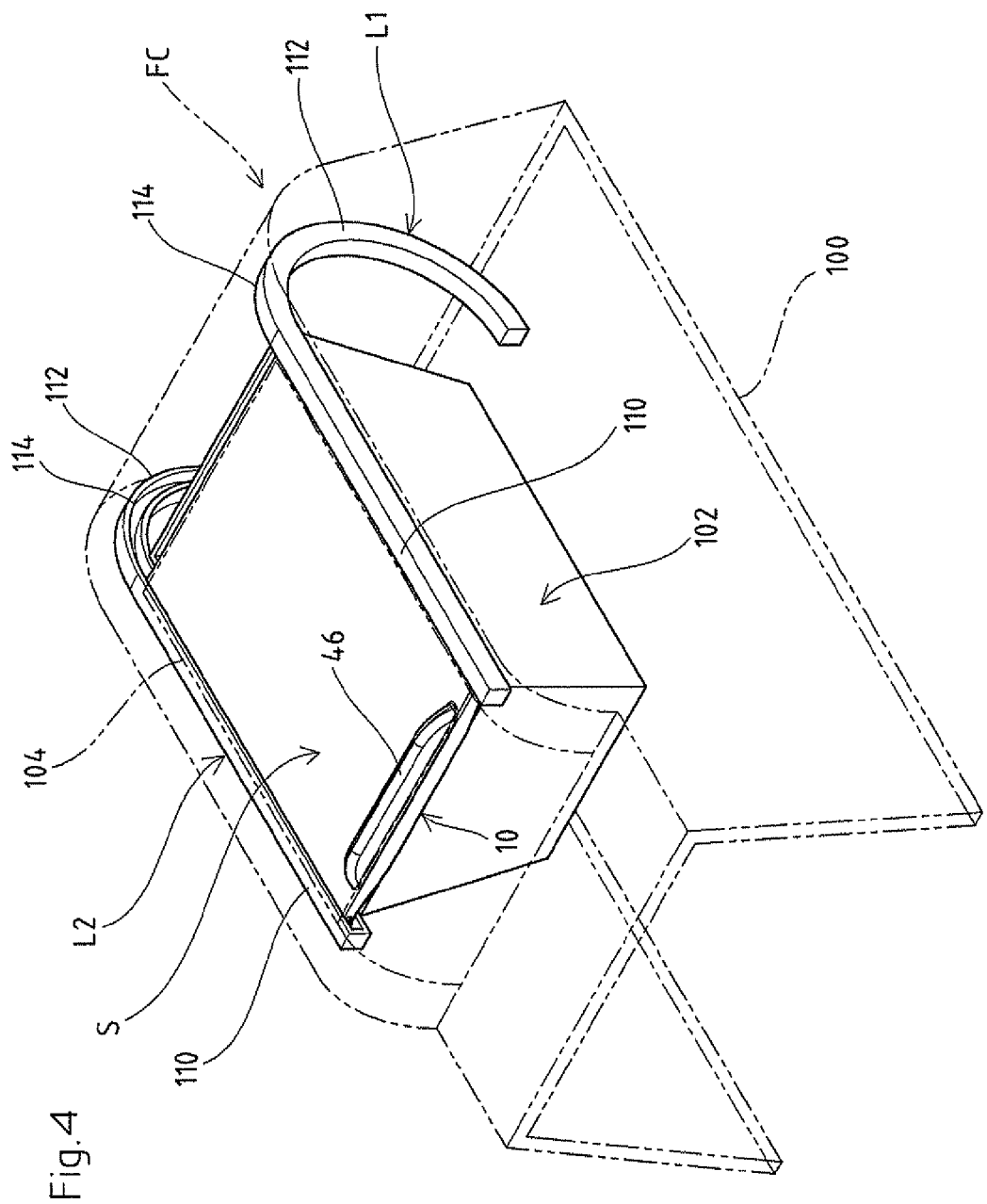
FIG. 4 is an explanatory perspective view showing a state that the shutter according to Embodiment 1 is used as a cover member of a floor console of an automobile.

A shutter according to the present invention will be hereinafter described by way of preferred embodiments, referring to attached drawings. While in the embodiments, as shown in FIG. 4, a shutter used as a cover member of a floor console FC of an automobile is illustrated, the shutter of the present application is not limited to a floor console and can be used for other types of console. In addition, in the following embodiments, as shown in FIG. 2(a), in a state where a shutter S is horizontal and flat, the sliding direction of the shutter S is referred to as "length direction", the direction horizontally orthogonal to the sliding direction (the opposing direction of both guiderails L1 and L2) is referred to as a "width direction", and the direction vertically orthogonal to the sliding direction is referred to as a "thickness direction".

Embodiment 1

In a floor console FC on which a shutter S of Embodiment 1 is disposed, as shown in FIG. 4, an article housing portion 102 opening upward is defined inside the rear in the front-back direction in a console main body 100. Further, the upper opening 104 of the article housing portion 102 is designed to be covered openably and closably by the shutter S. Inside the console main body 100, a pair of guiderails L1 and L2 is provided so as to be extended in the front-back direction of the console main body 100 and to be opposed in the width direction of the console main body 100 with the article housing portion 102 sandwiched thereby. Furthermore, the shutter S of Embodiment 1 is provided so as to be slidable along the guiderails L1 and L2 with each of slide supporting portions 30 described later respectively engaged with the guiderails L1 and L2.

Each of the guiderails L1 and L2 is, as shown in FIG. 4, fowled in a symmetrical shape in the width direction and is comprised of a linear portion 110, which extends horizontally in the front-back direction at a side edge of the upper opening 104 of the article housing portion 102, and a curved portion 112, which is bent downward from the rear part of the linear portion 110 in an arc manner beyond the rear part of the article housing portion 102 in a predetermined curvature. In each of the guiderails L1 and L2, a groove portion 114 extended from the linear portions 110 to the curved portions 112 is formed on the inner surfaces opposed to each other, and the slide supporting portions 30 are face the respective groove portions 114 so as to be engaged therewith.

The shutter S of Embodiment 1, as shown in FIGS. 1(a) to 4, is comprised of support portions 10 provided in array (or side by side) in the length direction for supporting a load applied to the shutter S, hinge portions 20 each formed between two adjoining support portions 10 so as to connect them, and slide supporting portions 30 provided respectively at one end 10A opposed to one guiderail L1 and at another end 10B opposed to the other guiderail L2 in each one of the support portions 10. The shutter S of Embodiment 1 is a molded member in which the support portion 10, the hinge portion 20 and the slide supporting portion 30 constituting the shutter S are integrally molded from one type of molding material by an injection molding die. As molding materials, synthetic resins such as hard polyethylene (PE) and polypropylene (PP) rather than thermoplastic elastomers are preferably employed.

In the shutter S of Embodiment 1, a total of 18 support portions 10 are provided in array in the length direction, and they are formed symmetrically in the width direction. Each of the support portions 10 has a width-wise length that corresponds to the space between the two guide rails L1 and L2, and it is, as shown in FIGS. 1(a) and 2(b), formed in an elongated shape in the width direction and protrudes toward the backside of the shutter S from the side of the hinge portion 20 Each of the support portions 10 is comprised of, as best seen from FIG. 2(b), a plate portion 12 constituting a front outer plate of the shutter S, a first beam portion 14 extended in the width direction of the shutter S, a second beam portion 16 spaced apart from and parallel to the first beam portion 14 in the length direction of the shutter S, and a plurality of connecting ribs 18 for connecting the first beam portion 14 and the second beam portion 16 to each other. The connecting ribs 18 between the first and second beam portions 14 and 16 are disposed with predetermined clearance in between in the width direction, and the support portion 10 that is thus composed of the first beam portion 14, the second beam portion 16 and the connecting ribs 18 is configured as what is called a ladder-like rib structure with a space between the first and second beam portions 14 and 16.

The first beam portion 14 and the second beam portion 16 are, as shown in FIGS. 2(b) and 3(b), formed in a symmetrical shape in the length direction of the shutter S and are designed such that the height in the thickness direction is set larger than the width in the length direction. Further, in the first beam portion 14 and the second beam portion 16, as shown in FIGS. 1(b) and 3(b), the width in the length direction is maximum (G1) at the side of the hinge portion 20 (side of the outer plate 12) and becomes gradually smaller in the direction away from the hinge portion 20 so as to be minimum (G2) at the tip end opposite to the hinge portion 20. Further, as best seen from FIG. 2(b), the first beam portion 14 and the second beam portion 16 are, when sectioned into four equal parts in the width direction for convenience sake, are formed such that the height is maximum (H1) in the section corresponding to two middle parts, and the height is minimum (H2) at one end 10A and the other end 10B of the support portion 10. Furthermore, the part near one end 10A of the first and second beam portions 14 and 16 is formed in a sloped shape such that the height becomes gradually smaller as being closer to (or toward) the one end 10A from the center. In addition, the part near the other end 10B of the first and second beam portions 14 and 16 is formed in a sloped shape such that the height becomes gradually smaller as being closer to (or toward) the other end 10B from the center. Accordingly, the support portion 10 which is of a rib structure with a space between the first and second beam portions 14 and 16 secures rigidity equivalent to that of the case where a space between both beam portions 14 and 16 is filled with a hard resin, so that, even if a load is applied to the support portion 10 in its middle section in the width direction from above, deflective deformation or torsional deformation in the width direction is less likely to occur.

Each of the support portions 10 composed of the first beam portion 14 and the second beam portion 16 is, as shown in FIGS. 1(b) and 3(b), formed such that the width in the length direction is maximum (W1) at the side of the hinge portion 20 (or at the side of the outer plate 12 and becomes gradually smaller in the direction away from the hinge portion 20 so as to be minimum (W2) at the tip end opposite to the hinge portion 20. In other words, the support portion 10 is formed in a protruding manner toward the backside of the shutter S such that the shape seen from the outside in the width direction of the shutter S is tapered in the direction away from the hinge portion 20 to form a trapezoidal shape.

The hinge portion 20 is formed, as shown in FIGS. 1(a) to 3(b), integrally with the plate portion 12 of the support portions 10 adjoining each other in the length direction to connect each of the support portions 10 in lateral array at a location facing the front side in the thickness direction. In addition, the hinge portion 20 is formed to be thinner than the support portion 10 to allow elastic flexure deformation or bending deformation. Further, the hinge portion 20 is designed to be deformable until the backside of the support portions 10 spaced apart from the front thereof comes into proximity and the first beam portion 14 of one support portion 10 and the second beam portion 16 of the other support portion 10, which adjoin each other, are brought into contact with each other. The clearance between two support portions 10 adjoining each other with the hinge portion 20 being sandwiched thereby is, as mentioned above, formed in a trapezoidal shape, and thus, in the flat state of the shutter S, the clearance is narrowest at the side of the hinge portion 20 and becomes gradually greater in the direction away from the hinge portion 20. The thickness of the hinge portion 20 is set to around 0.5 mm. Thus, it is designed such that, even if the hinge portion 20 is formed from a molding material of hard synthetic resin having necessary rigidity, elastic flexure deformation or bending deformation can be possible until the adjoining support portions 10 are brought into contact with each other, and in addition, even when the adjoining support portions 10 are bent until brought into contact with each other, breakage due to plastic deformation does not occur.

Next, each one of slide supporting portions 30 provided at one end 10A and the other end 10B in the width direction of each of the support portions 10 will be described referring to FIGS. 1(a) to 3(b). The slide supporting portion 30 provided at one end 10A and the slide supporting portion 30 provided at the other end 10B of each of the supporting portions 10 are formed symmetrically in the width direction, and thus the same reference numerals will be allotted to the same portions.

Each of the slide supporting portions 30 is provided at the backside to protrude from the side of the hinge portion 20 in the thickness direction and comprises a first abutting portion 32 and a second abutting portion 34 that is provided so as to be spaced apart from the first abutting portion 32 in the length direction.

The first abutting portion 32 is formed so as to be elongated horizontally from the end of the first beam portion 14 in the support portion 10 and positioned on the same axis in the width direction, and it includes an arm portion 32A connected to the end of the first beam portion 14 and an abutting protrusion 32B formed at the tip end of the arm portion 32A. The abutting protrusion 32B is, as shown in FIGS. 3(a) and 3(b), formed in a cylindrical shape having two circular end surfaces around an axis 32 extended in the length direction when seen in the length direction of the shutter S. Further, both end faces in the length direction of the abutting protrusion 32B are formed in a planar shape, and the outer peripheral faces thereof are formed in a curved shape so as to bulge outward, so that they have a diameter which allows them to protrude into the groove portions 114 of the guiderails L1 and L2. In addition, the abutting protrusion 32B is designed such that the outer peripheral faces can be point-contacted with each of a bottom surface 114A, a top surface 114B and a side surface 114C of the groove portion 114. The arm portion 32A is approximately rectangular in its longitudinally sectional shape, and the size in the thickness direction is larger at the connecting rib to the first beam portion 14, making deflective deformation less likely to occur for the first beam portion 14 in the length direction and the thickness direction.

Further, the second abutting portion 34 of the respective slide supporting portions 30 is formed in a shape symmetrical to the first abutting portion 32 in the length direction, and it includes an arm portion 34A connected to the end of the second beam portion 16 and an abutting protrusion 34B formed at the tip end of the arm portion 34A. Each second abutting portion 34 is formed so as to be elongated horizontally from the end of the second beam portion 16 in the support portion 10 to be positioned on the same axis in the width direction, and it includes the arm portion 34A connected to the end of the second beam portion 16 and the abutting protrusion 34B formed at the tip end of the arm portion 34A. The abutting protrusion 34B is, as shown in FIGS. 3(a) and 3(b), formed in a cylindrical shape having two circular end surfaces around the axis J2 extended in the length direction when seen in the length direction of the shutter S. Further, both end faces in the length direction of the abutting protrusion 34B are formed in a planar shape, and the outer peripheral faces thereof are formed in a curved shape so as to bulge outward, so that they have a diameter which allows them to protrude into the groove portions 114 of the guiderails L1 and L2. In addition, the abutting protrusion 34B is designed such that the outer peripheral face can be point-contacted with each of the bottom surface 114A, the top surface 114B and the side surface 114C. The arm portion 34A of the second beam portion 34 is approximately rectangular in its longitudinally sectional shape, and the size in the thickness direction is larger at the connecting rib to the second beam portion 16, making deflective deformation less likely to occur for the second beam portion 16 in the length direction and the thickness direction.

Each of the slide supporting portions 30 is, as shown in FIG. 3(b), formed in such a shape as to be tapered from the hinge portion 20 side toward the side away from the hinge portion 20 in conformity to the trapezoidal shape of the support portion 10 in which the slide supporting portion 30 is formed. More specifically, a section away from the hinge portion 20 on the end face opposite to the second abutting portion 34 of the first abutting portion 32 of the slide supporting portion 30 is formed in a sloped shape in conformity to the sloped outer wall of the first beam portion 14 of the support portion 10. Similarly, a section away from the hinge portion 20 on the end face opposite to the first abutting portion 32 of the second abutting portion 34 of the slide supporting portion 30 is formed in a sloped shape in conformity to the sloped outer wall of the second beam portion 16 of the support portion 10. With these structures, when the shutter S is in the flat state, the clearance between the first abutting portion 32 of the slide supporting portion 30 provided in one support portion 10 and the second abutting portion 34 of the slide supporting portion 30 provided in the other support portion 10, which adjoin each other, is greater at the side away from the hinge portion 20 than at the side of the hinge portion 20. Accordingly, in each of the slide supporting portions 30, even if the clearance between the first abutting potion 32 and the second abutting portion 34 is set greater in the length direction, the first abutting portion 32 and the second abutting portion 34 of the adjoining slide supporting portions 30 are prevented from being brought into contact with each other when the adjoining support portions 10 are displaced in their postures to be in proximity due to elastic deformation of the hinge portion 20.

Further, each of the support portions 10 provided with the slide supporting portions 30 at both ends of one end 10A and the other end 10B is, as shown in FIGS. 3(a) and 3(b), supported by a pair of guiderails L1 and L2 by means of four-point support given by four abutting portions of the first abutting portion 32 and the second abutting portion 34 of one slide supporting portion 30 and the first abutting portion 32 and the second abutting portion 34 of the other slide supporting portion 30. In other words, contacting points P1 and P2 where each of the abutting portions 32 and 34 of one slide supporting potion 30 abuts the bottom surface 114A of the groove portion 114 in one guiderail L1 and contacting points P3 and P4 where each of the abutting portions 32 and 34 of the other slide supporting potion 30 abuts the bottom surface 114A of the groove portion 114 in the other guiderail L2 have a relationship to form a quadrangle line B.

Accordingly, when a load is applied to the plate portion 12 from the front side, four abutting portions of the respective first abutting portions 32 and the respective second abutting portions 34 in each of the slide supporting portions 30 abut a pair of guiderails L1 and L2, so that rotational displacement around an axis J1 extended in the width direction is prevented, which allows each of the supporting portions 10 to be stably supported. If at least three or more out of the four abutting portions in total of the respective first abutting portions 32 and the respective second abutting portions 34 of each of the slide supporting portions 30 abut a pair of guiderails L1 and L2, then rotational displacement is prevented to allow the support portion 10 to be stably supported.

In the shutter S of Embodiment 1, a grip portion 46 protruding upward and extended in the width direction with approximately the same size as the size of the support portion 10 in the length direction is provided on the plate portion 12 of the support portion 10 that is formed as the front surface of the floor console FC. Accordingly, the slide operation of the shutter S can be performed easily by gripping the grip portion 46 with fingers.

In the above-mentioned shutter S of Embodiment 1, the first abutting portion 32 and the second abutting portion 34 of each of the slide supporting portions 30 provided at one end 10A of each of the support portions 10 are protruded respectively into the groove portion 114 of one guiderail L1 provided in the console main body 100 so as to be engaged therewith. Further, the first abutting portion 32 and the second abutting portion 34 of each of the slide supporting portions 30 provided at the other end 10B of each of the support portions 10 are protruded respectively into the groove portion 114 of the other guiderail L2 so as to be engaged therewith. The shutter S is thus disposed slidably in the console main body 100. When the shutter S is slid toward the front of the console main body 100 so as to face the upper opening 104 of the article housing portion 102, the slide supporting portions 30 of each of the support portions 10 come to be positioned at the linear portion 110 of each of the guiderails L1 and L2; as a result, the shutter S takes a flat state like a piece of flat plate, which allows the upper opening 104 to be covered entirely by the shutter S (see FIG. 4).

In addition, the shutter S of Embodiment 1, in a flat state where the upper opening 104 of the article housing portion 104 is covered entirely thereby, can maintain the flat state appropriately, even if a certain degree of load is applied thereto from above when, for instance, an article or an arm of a passenger is placed on its front side facing upward, and when a hand of passenger is put thereon. More specifically, each of the support portions 10 having received a load from the front side of the shutter S in the thickness direction can retain its posture stably without rotational displacement, because at least three or more out of the four abutting portions in total of the first and second abutting portions 32 and 34 of one slide supporting portion 30 and the first and second abutting portions 32 and 34 of the other slide supporting portion 30 come to abut the bottom surfaces 114A of the grooves 114 in the respective guiderails L1 and L2. In addition, each of the support portions 10 constitutes a rib structure composed of the first beam portion 14, the second beam portion 16 and the connecting ribs 18 and has rigidity; accordingly, even if a load is applied to the plate portion 12 from above, deflective deformation and torsional deformation in the width direction can be reduced.

On the other hand, when the shutter S is slid toward the rear of the console main body 100, the support portions 10 of the shutter S at the rear side in the length direction are designed to be first moved to the curved portions 112 of each of the guiderails L1 and L2. Then, when the support portions 10 are moved to the curved portion 112 of each of the guiderails L1 and L2, the abutting protrusion 32b of the first abutting portion 32 and the abutting protrusion 34b of the second abutting portion 34 of each of the slide supporting portions 30 provided in the support portion 10 come to abut the upper surfaces 114B of the groove of each of the guiderails L1 and L2. As a result, when the support portions 10 are moved to the curved portion 112 of each of the guiderails L1 and L2, since the hinge portion 20 between two adjoining support portions 10 is elastically deformed, one support portion 10 is displaced in its posture relative to the other support portion 10. Accordingly, as shown in FIG. 1(b), the shutter S is deformed into a curved state in the same curvature as that of the curved portion 112 of each of the guiderails L1 and L2 due to elastic deformation of each of the hinge portions 20.

In this manner, in the shutter S of Embodiment 1, when a load is applied to the front side of the shutter S, each of the support portions 10 constituting the shutter S is supported by the pair of guiderails L1 and L2 at three or more out of the respective first abutting portions 32 and the respective second abutting portions 34 (four in total) with two being provided for the slide supporting portions 30 provided for each of one end 10A and the other end 10B, and the support portion 10 is not rotationally displaced around the axis J1 extended in the width direction. Moreover, the first abutting portion 32 and the second abutting portion 34 of the slide supporting portion 30 are respectively provided at one end 10A and at the other end 10B of the support portions 10 with the center being sandwiched thereby in the length direction of the supporting portion 10; as a result, even if a load is applied to the support portion 10 at a position shifted from the center of the support portion 10 in the sliding direction (a position closer to the hinge portion 20 than the center), the supporting portion 10 is less likely to be rotationally displaced around the axis J1 extended in the width direction. In other words, in the shutter S of Embodiment 1, when a load is applied to each of the support portions 10 from the front side (or from above), stress is less likely to concentrate on the hinge portion 20 connecting the support portions 10, and it becomes possible to form the hinge portion 20 more thinly. As a result, the hinge portion 20 can have sufficient flexibility, even if it is formed to be thin by the same molding material as that for forming the support portion 10 and each of the slide supporting portions 30. Accordingly, it is possible to integrally mold the support portion 10, the hinge portion 20 and the slide supporting portion 30 by the same hard resin. More specifically, since only one type of molding material can be used to integrally mold the shutter S in one step, material costs can be inexpensive, man-hours for molding operation can be reduced, and it is possible to keep the production costs down.

In addition, since the shutter S is, as mentioned above, molded integrally from one type of molding material, the support portion 10 and the hinge portion 20 are prevented from being detached from each other at the boundary section that is between them. Likewise, since each of the support portions 10 and the slide supporting portion 30 are also prevented from being detached from each other at the boundary section that is between them, there is no such case that the shutter S cannot be used due to the detachment.

Further, faces opposed to each other with the hinge portion 20 being sandwiched thereby of the first abutting portion 32 of the slide supporting portion 30 provided on one support portion 10 and the second abutting portion 34 of the slide supporting portion 30 provided on another supporting support portion 10, which adjoin each other in the sliding direction of the shutter, are formed so as to be away further separated from each other in the direction away from the hinge portion 20. Accordingly, even if a clearance in the sliding direction is set greater, the first abutting portion 32 and the second abutting portion 34 of the slide supporting portion 30 are not brought into contact with each other when the shutter S is deformed into a curved state, so that and the shutter is not prevented from being deformed into the curved state. In addition, since the clearance in the sliding direction and between the first abutting portion 32 and the second abutting portion 34 in the slide supporting portion 30 can be made greater, the stability of the support portion 10 can be enhanced even when a load is applied to the shutter S which is in the flat state.

Further, each of the support portions 10 constitutes a rib structure that comprises the first and second beam portions 14 and 16 arrayed in the length direction and the connecting ribs 18 for connecting two beam portions 14 and 16; accordingly, the support portions 10 can have rigidity less likely to cause deflective deformation or torsional deformation even if a conceivable load is received. In particular, since the first beam portion 14 and the second beam portion 16 in the central portion in the width direction of each of the support portions 10 are designed to be high, a load applied to the shutter S from the front side can be appropriately received with deflective deformation being controlled. In addition, each of the support portions 10 is formed, in the size in the length direction, in a trapezoidal shape that is tapered as being further spaced apart from the hinge portion 20 in the thickness direction, the deformation of the shutter S into a curved state due to the deformation of the hinge portion 20 is not restricted.

Further, since the frictional resistance between the first abutting portion 32 and the second abutting portion 34 of each of the slide supporting portions 30 and each of the guiderails L1 and L2 is restricted to be small, the shutter S can be slidingly moved with less power, and the operability of opening and closing of the shutter S is high.

Furthermore, since a space is provided between the first beam portion 14 and the second beam portion 16 in each of the support portions 10, weight reduction of the shutter S can be achieved, and there is less amount of molding materials to be used as well, which can keep the production costs low. Moreover, since less amount of molding materials is used, the disadvantage of mold sink mark occurring during molding at a section corresponding to the support portion 10 on the outer surface of the shutter S can be prevented.

Embodiment 2

Figure 5:
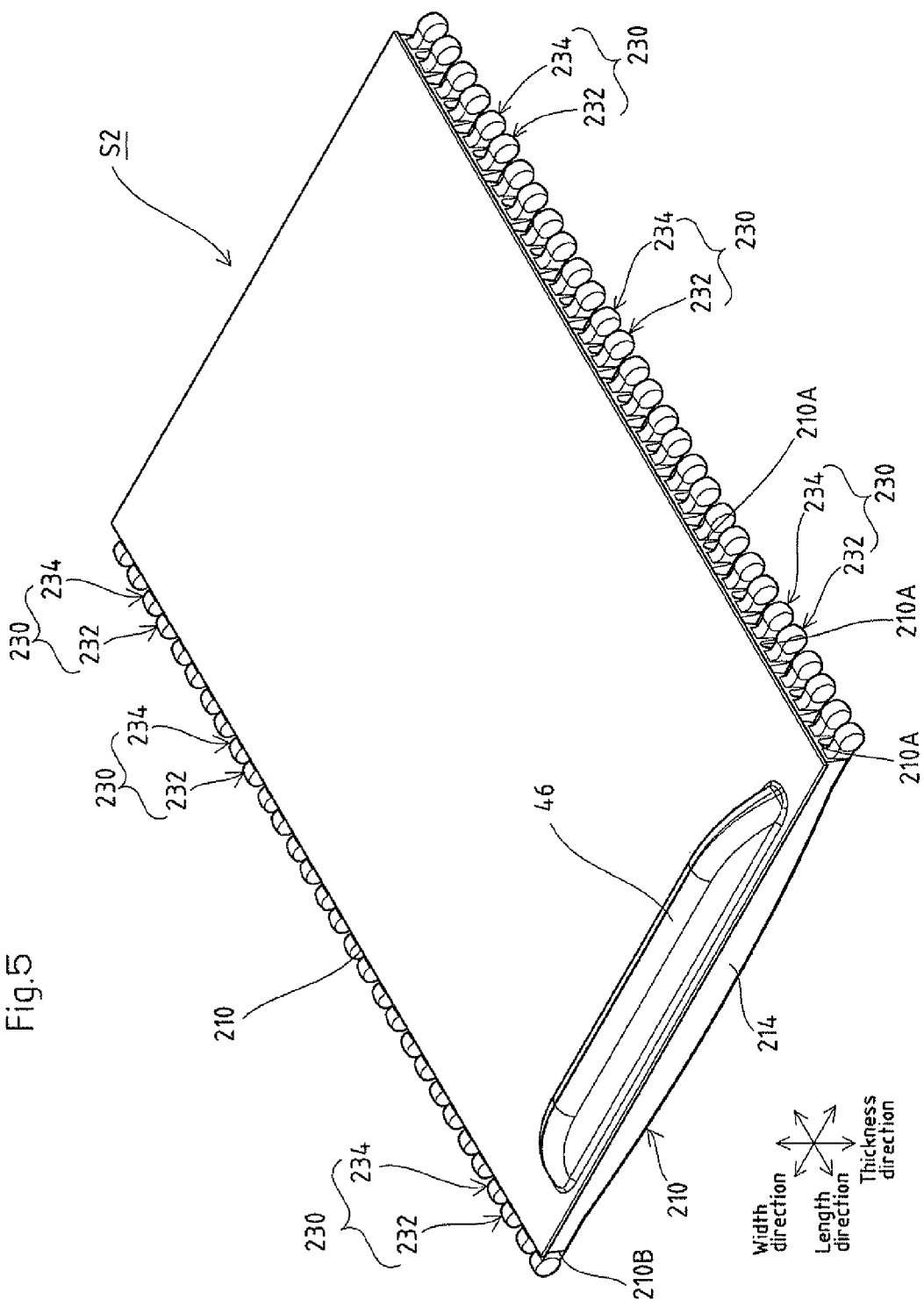
FIG. 5 is a perspective view showing a shutter according to Embodiment 2 of the present invention.
Figure 6:
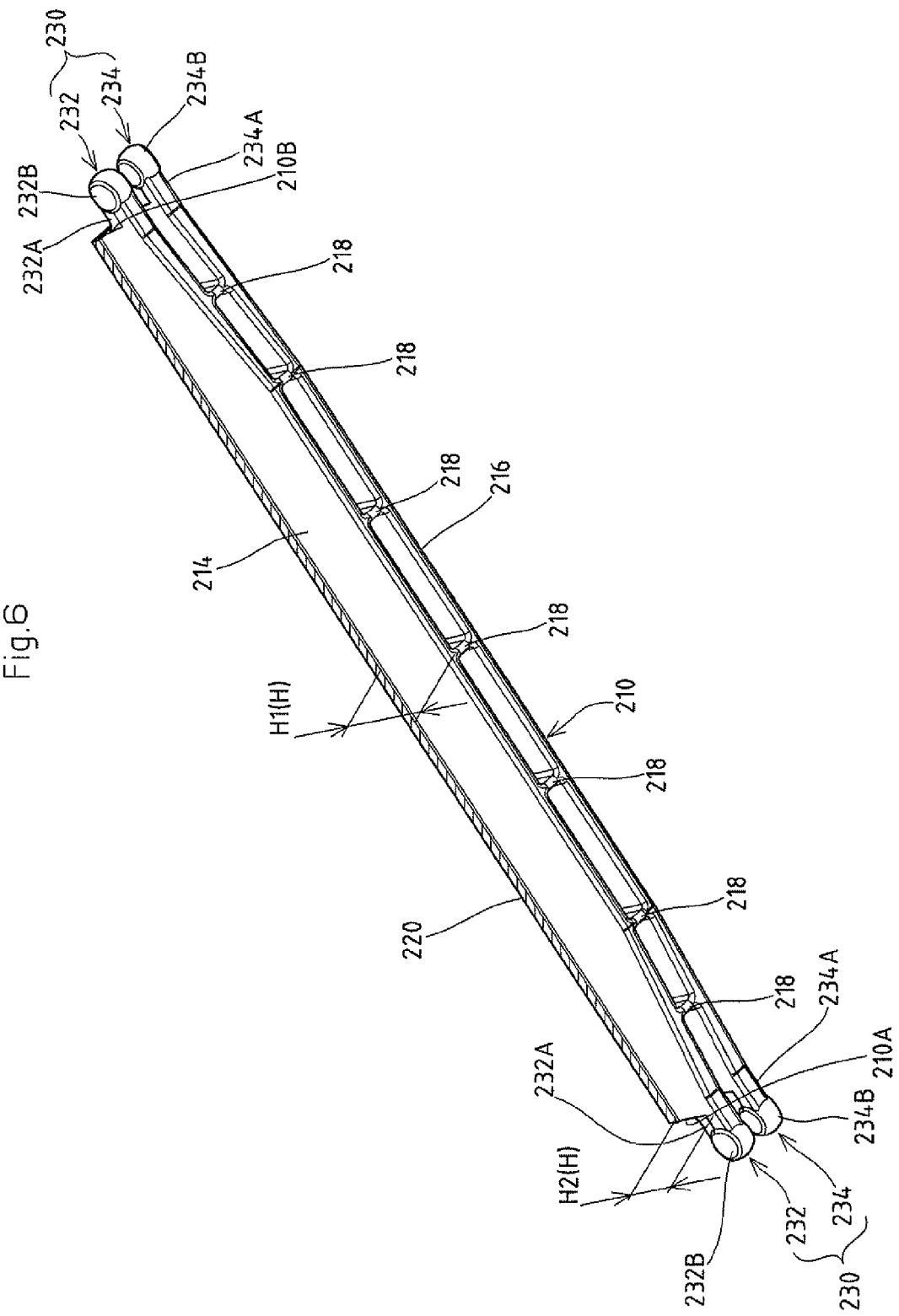
FIG. 6 is a perspective view showing in enlargement the main part of one of the support portions constituting the shutter according to Embodiment 2.
Figure 7:
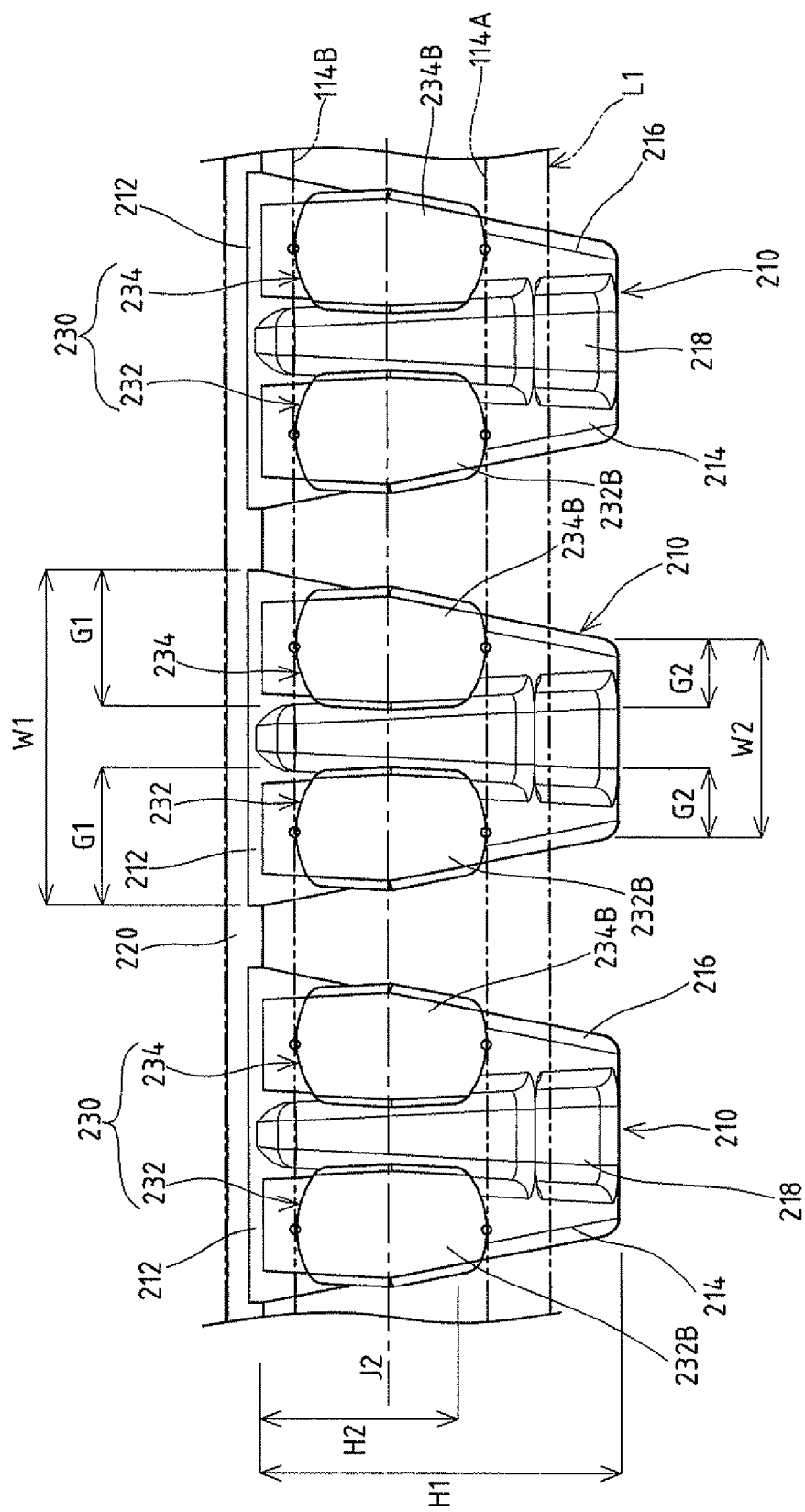
FIG. 7 is a side view showing a part of the shutter according to Embodiment 2.
Figure 8:
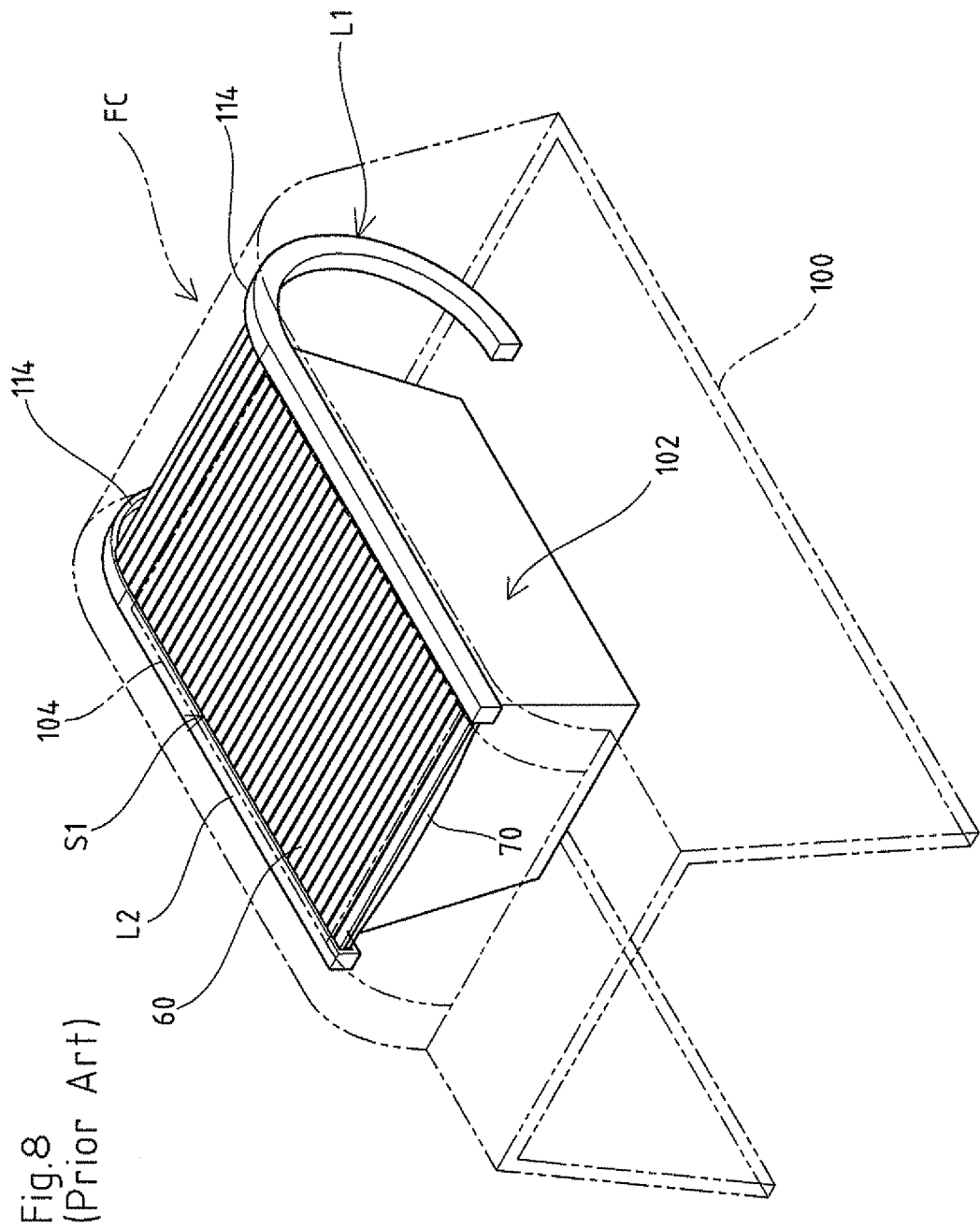
FIG. 8 is an explanatory perspective view showing a state where a conventional shutter is used as a cover member of a floor console of an automobile.
Figure 9:
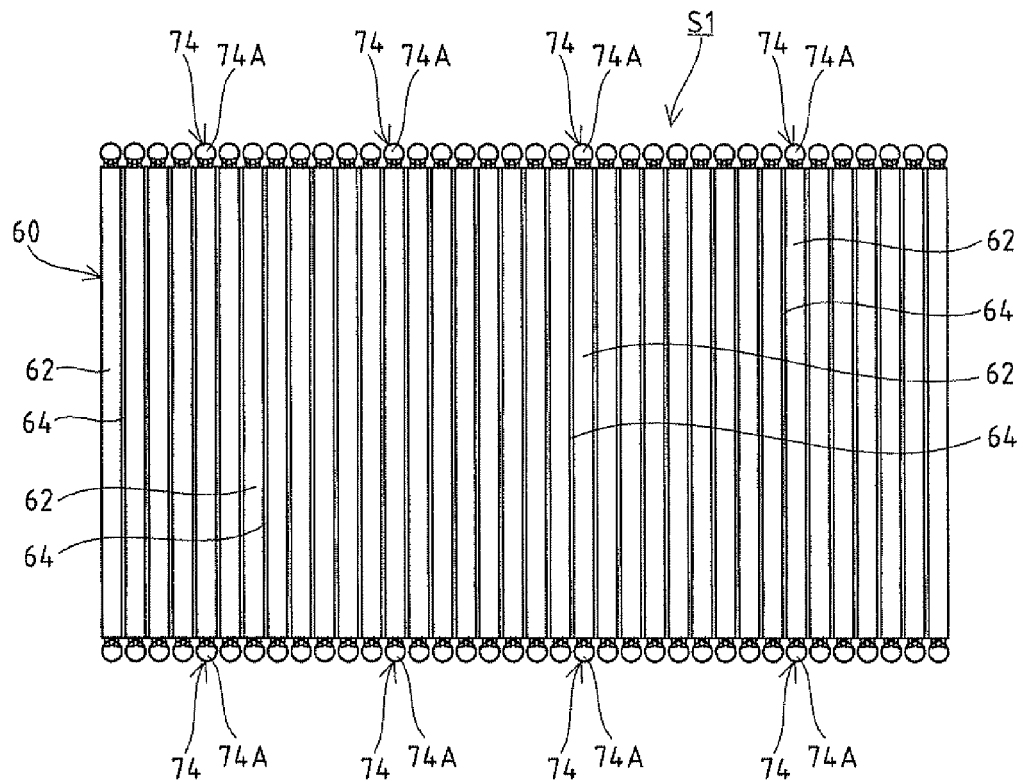
FIG. 9(a) is a plan view of the conventional shutter.
FIG. 9(b) is a side view of the conventional shutter.
Figure 9:
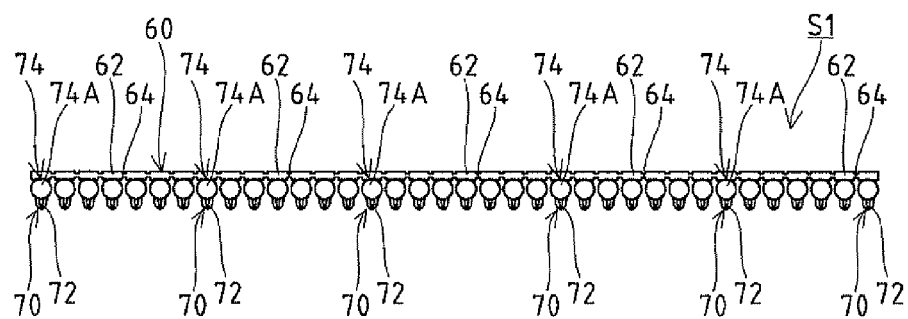
Figure 10A:
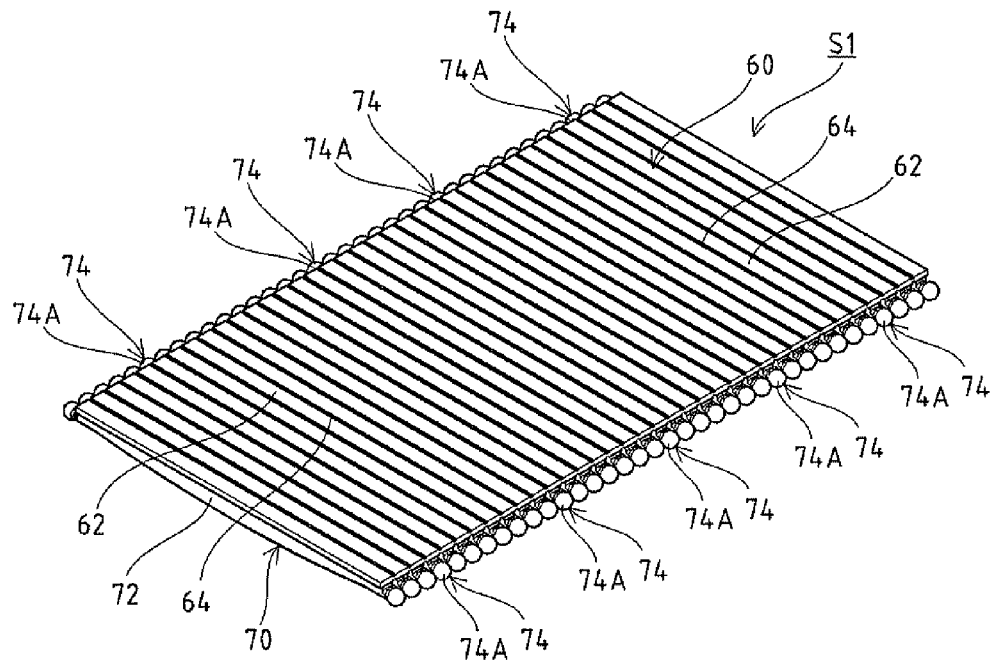
FIG. 10(a) is a perspective view of the conventional shutter.
Figure 10B:
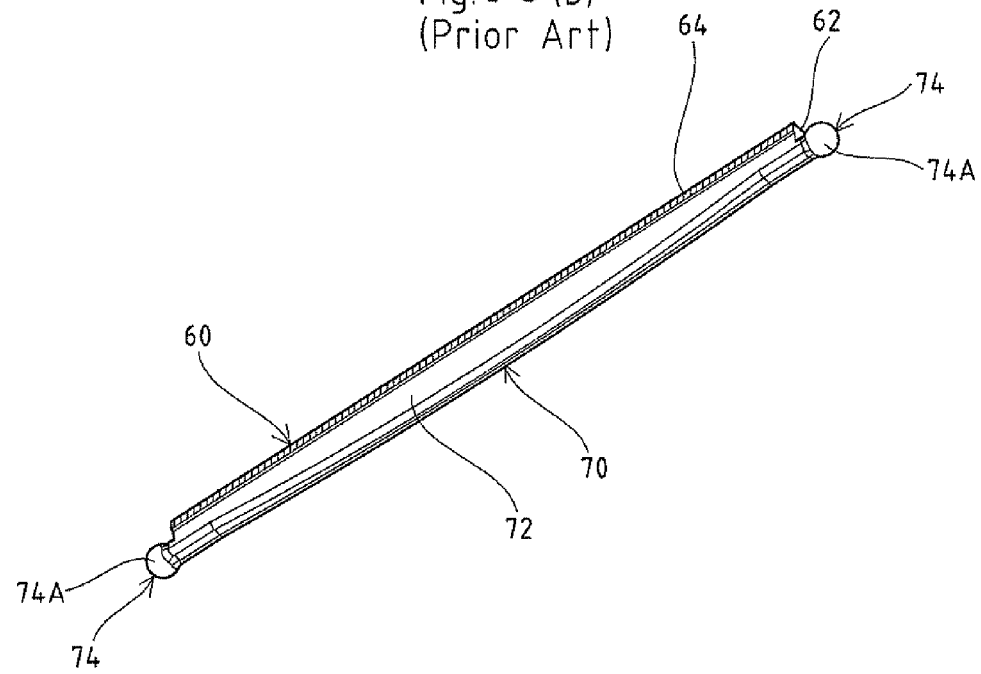
FIG. 10(b) is a perspective view showing one of rib portions constituting the conventional shutter.
Figure 11A:
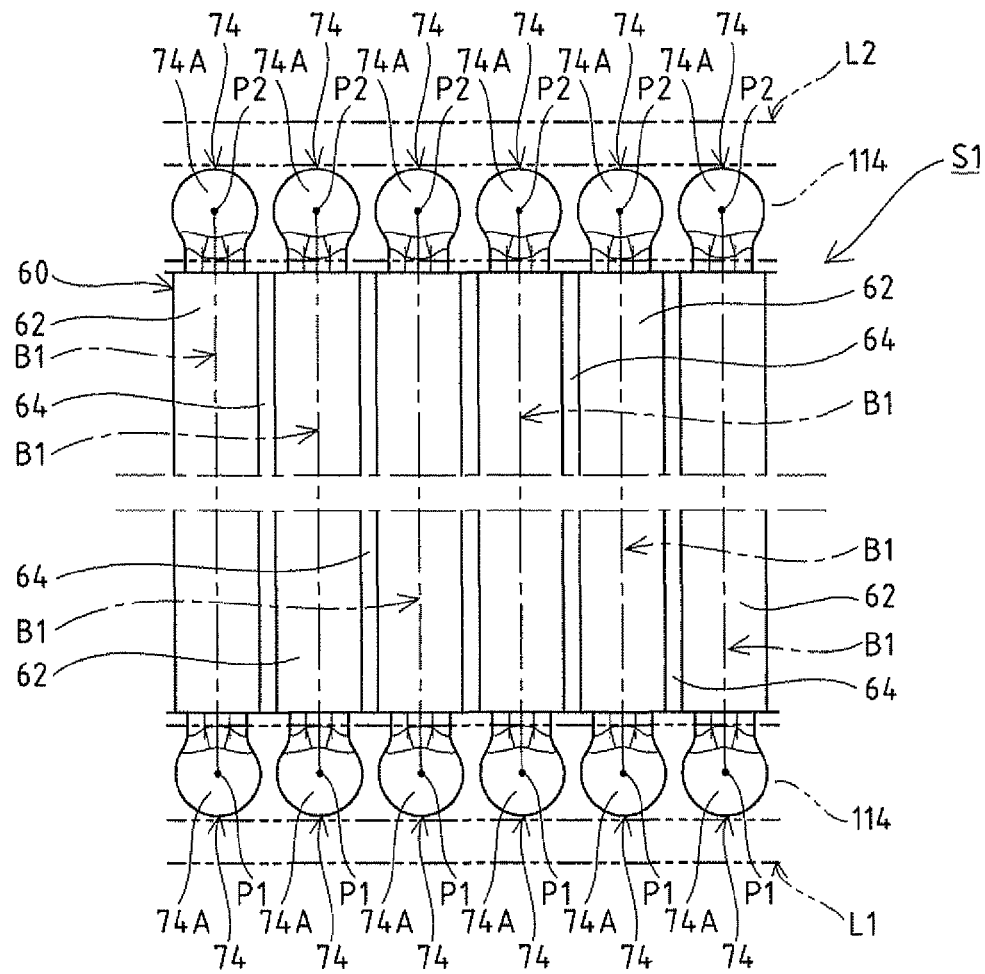
FIG. 11(a) is an explanatory drawing illustrating that the rib portion is supported by a pair of guiderails by means of two-point support that is formed by an abutting portion of a slide supporting portion provided at one end of the rib portion and another abutting portion of a slide supporting portion provided at the other end of the rib portion.
Figure 11B:
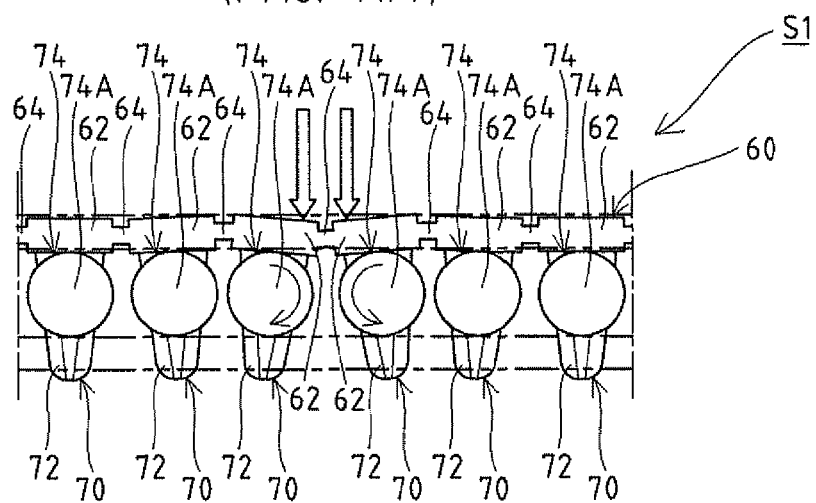
FIG. 11(b) is an explanatory drawing illustrating the state in FIG. 11(a) seen from the side and showing that the rib portion is rotationally displaced around an axis extended in the width direction by the external force from above.

A shutter S2 of Embodiment 2 is, equivalently to Embodiment 1, disposed slidably at a pair of guiderails L1 and L2 of the floor console FC and is designed to open and close the upper opening 104 of the article housing portion. The shutter S2 of Embodiment 2 is, as shown in FIGS. 5 to 7, provided in array in the length direction of the shutter S2 and is provided with support portions 210 for supporting a load applied to the shutter S2, hinge portions 220 formed so as to connect the adjoining supporting portions 210, and slide supporting portions 230 provided respectively at one end 210A opposed to one guiderail L1 and at another end 210B opposed to the other guiderail L2 in each of the support portions 210. In the shutter S2 of Embodiment 2, each of the support portions 210 and the slide supporting portions 230 are integrally formed. In addition, in the shutter S2, each of the hinge portions 220, which is softer than the support portion 210 and the slide supporting portions 230, is formed separately from the support portion 210 and the slide supporting portions 230.

Furthermore, in the shutter S2 of Embodiment 2, at the backside of the plate-like hinge portion 220 constituting the shutter S2, a plurality of (18) support portions 210 are disposed in array in the length direction of the shutter S2. Each support portion 210 comprises, as best seen from FIG. 6, a plate portion 212 mated with the backside of the hinge portion 220, a first beam portion 214 extended in the width direction of the shutter S2, a second beam portion 216 spaced apart from and parallel to the first beam portion 214 in the length direction of the shutter S2 and a plurality of connecting ribs 218 for connecting the first beam portion 214 and the second beam portion 216 to each other. The support portion 210 of Embodiment 2 has basically the same configuration as that of the support portion 10 of Embodiment 1, and the dimensional relationships of the support portion 210 (G1, G2, H1, H2, W1, W2) shown in FIG. 7 is equivalent to the dimensional relationships of the support portion 10 (G1, G2, H1, H2, W1, W2) illustrated for Embodiment 1. As molding materials which form the support portions 210 and the slide supporting portions 230, synthetic resins such as polyethylene (PE), polypropylene (PP), acrylonitrile butadiene styrene resin (ABS) and polycarbonate (PC) harder than thermoplastic elastomers are preferably employed.

The slide supporting portions 230 of Embodiment 2 are provided to protrude further backside from both sides of the hinge portion 220 in the thickness direction, and each of the slide supporting portions 20 is comprised of a first abutting portion 232 and a second abutting portion 234 provided so as to be spaced apart from the first abutting portion 232 in the length direction of the shutter S2. Each of the first abutting portions 232 is formed so as to be elongated horizontally from the end of the first beam portion 214 of the support portion 210 to be positioned on the same axis in the width direction of the shutter S2, and the first abutting portion 232 includes an arm portion 232A connected to the end of the first beam portion 214 and an abutting protrusion 232B formed at the tip end of the arm portion 232A. On the other hand, the second abutting portion 234 is formed in a shape symmetrical to the first abutting portion 232 in the length direction of the shutter S2, and it includes an arm portion 234A connected to the end of the second beam portion 216 and an abutting protrusion 234B formed at the tip end of the arm portion 234A. The slide supporting portion 230 of Embodiment 2 has the equivalent configuration to that of the slide supporting portion 30 of Embodiment 1, and the relationships with respect to other sections such as the guiderails L1 and L2 are also the same as those of Embodiment 1.

The hinge portion 220 of Embodiment 2 is, as shown in FIGS. 5 to 7, a plate body and is a separate element from the support portion 210, and it is constituted from a soft foam such as urethane or the like that has certain flexibility. The shutter S2 of Embodiment 2 is formed by injecting a foaming material into a mold in which the support portion 210 formed with the slide supporting portion 230 is set, thus foam-molding soft foam that constitutes the hinge portion 220, and then connecting the support portion 210 with the hinge portion 220. The shutter S2 of Embodiment 2 may be formed by connecting the support portion 210 and the hinge portion 220, which were separately formed, with each other with an adhesive, or the like. As shown in FIG. 7, the support portion 210 is disposed so that the plate portion 212 is embedded on the backside of the hinge portion 220 to largely secure the mating area between the support portion 210 and the hinge portion 220. When forming the hinge portion 220 from soft urethane resin foam, it is preferable to form the support portion 210 from acrylonitrile butadiene styrene (ABS) or polycarbonate (PC), or their alloy, since it provides better adhesiveness between the hinge portion 220 and the support portion 210.

The shutter S2 of Embodiment 2 provides the function and effect equivalent to those of Embodiment 1. In other words, the support portions 210 of Embodiment 2 are supported by a pair of guiderails L1 and L2 by means of four-point support given by four abutting portions of the first and second abutting portions 232 and 234 that are on one side of the slide supporting portion 230 and of the first and second abutting portions 232 and 234 that are on the other side of the slide supporting portion 230. As a result, when a load is applied to the shutter S2 from the front side, four abutting portions of the respective first abutting portions 232 and the respective second abutting portions 234 of each of the slide supporting portions 230 about the pair of guiderails L1 and L2, so that rotational displacement around an axis extended in the width direction is prevented, allowing each of the supporting portions 210 to be stably supported. If at least three or more out of the four abutting portions in total of the respective first abutting portions 232 and the respective second abutting portions 234 of each of the slide supporting portions 230 abut the pair of guiderails L1 and L2, then rotational displacement is prevented to allow the support portion 210 to be stably supported.

The shutter S2 of Embodiment 2 is structured so that the rotational displacement of the support portion 210 is prevented; accordingly, the hinge portion 220 can be formed from a softer material than the support portion 210 and the slide supporting portion 230, such as soft foam. In this manner, the formation of the hinge portion 220 from a soft material allows the shutter S2 to be slidingly moved with less power, improving the operability of opening and closing of the shutter S2, Moreover, in the hinge portion 210, not only an area between the adjoining support portions 210 is bent, but also an area covering the front of the support portion 210 is stretched and contracted; accordingly, the operability of the shutter S2 can be further improved. In addition, the shutter S2 is constituted from a hinge portion 210 with the surface being formed from a soft foam, which allows a comfortable feeling when touching it, so that it can also be used as an armrest.
Modifications (1) The number of the support portion 10 to be disposed is not limited to the number employed in the Embodiments, and it can be increased or decreased depending on the size of the opening of the upper opening 104.

(2) The first abutting portion 32 and the second abutting portion 34 of each of the slide supporting portions 30 may be configured so that they are formed, for example, as a single member with the respective arm portions 32A being integrally connected, so that the respective abutting points of the respective abutting protrusions 32B are point-contacted with the groove portions 114 of the guiderails L1 and L2. Further, the respective abutting protrusions 32B may also be designed to have a portion connected thereto which is not in contact with the groove portions 114 of the guiderails L1 and L2.

(3) The shutter S of the present invention can be used as various cover members, partitioning members, shielding members, or the like other than the floor console FC installed in an automobile illustrated in Embodiments.

What is claimed is:

1. A shutter disposed slidably along a pair of guiderails oppositely arranged, comprising:
   support portions provided in array between the pair of guiderails in a sliding direction of said shutter;
   hinge portions having flexibility and connecting adjoining support portions;
   two abutting portions formed in array in the sliding direction at each end of each of the support portions so that four abutting portions in total are provided in one support portion; and
   each of said abutting portions engaging slidably with a bottom surface of each of the guiderails, wherein
   each of the support portions is comprised of a first beam portion extended in a width direction of the shutter, a second beam portion spaced apart from and parallel to the first beam portion in the sliding direction of the shutter, and a plurality of connecting ribs for connecting the first beam portion and the second beam portion to each other,
   said abutting portions are provided on both ends of the first beam portion and both ends of the second beam portion, and
   said plurality of connecting ribs secure rigidity between the first beam portion and the second beam portion.

2. The shutter according to claim 1, wherein each of the hinge portions is formed from a material softer than that of the support portions and the abutting portions.

3. The shutter according to claim 1, wherein the support portions, the hinge portions and the abutting portions are made of a same material.

4. The shutter according to claim 1, wherein each of the support portions is provided with the abutting portions on both sides of a center thereof in the sliding direction.

5. The shutter according to claim 1, wherein
   each of the support portions is provided to protrude further backside than the hinge portions and the abutting portions are provided further backside than the hinge portions,
   the hinge portions allow the shutter to be in a flat state and in a curved state, and
   adjoining abutting portions on both sides of the hinge portions are, in the flat state of the shutter, formed such that faces thereof opposed to each other become inclined as separated from each other in a direction of a backside of the shutter away from the hinge portions.

6. The shutter according to claim 1, wherein a size of each of the support portions in a thickness direction of the shutter that is orthogonal to the sliding direction is minimum at both ends thereof and is larger at a central portion thereof in a width direction of the shutter than at the both ends.

7. The shutter according to claim 1, wherein three or more out of the four abutting portions of the respective support portions abut each of groove portions of the guiderails so that when an outer load is applied in-between the support portions, rotational displacement of the support portions is prevented.

* * * * *